Figure 1:
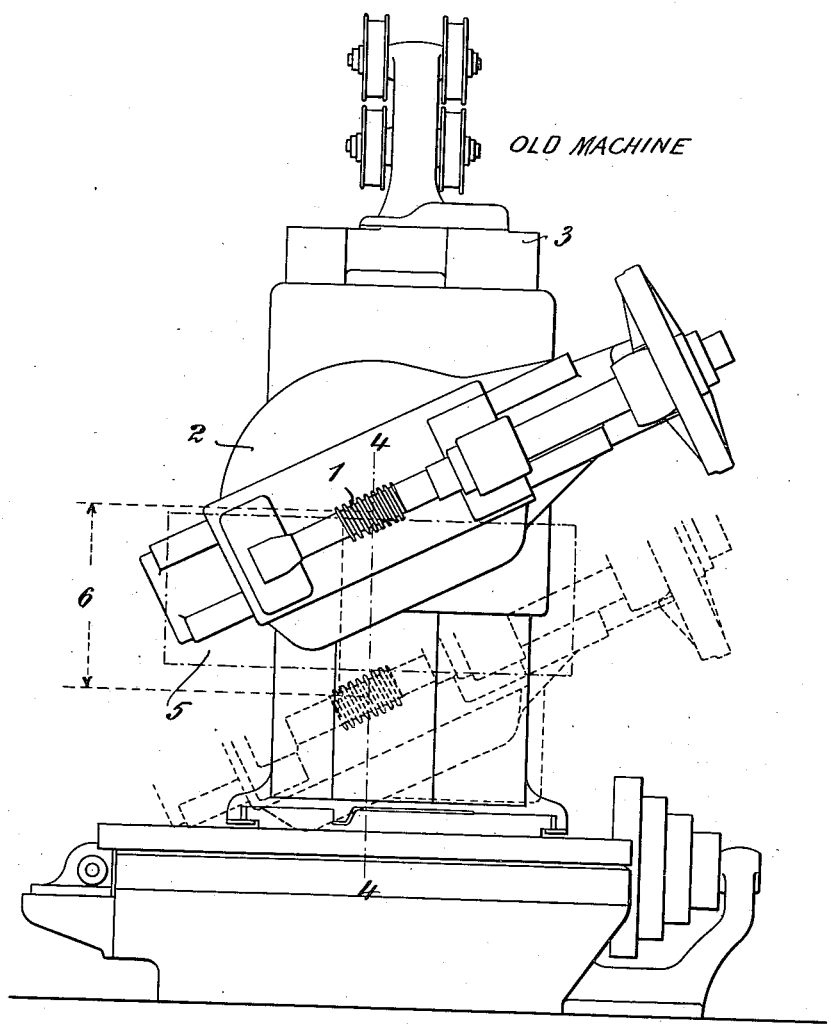

R. REINECKER.
METHOD OF AND APPARATUS FOR CUTTING THE TEETH OF GEAR WHEELS.
APPLICATION FILED SEPT. 22, 1914.

1,140,610.

Patented May 25, 1915.
3 SHEETS—SHEET 1.

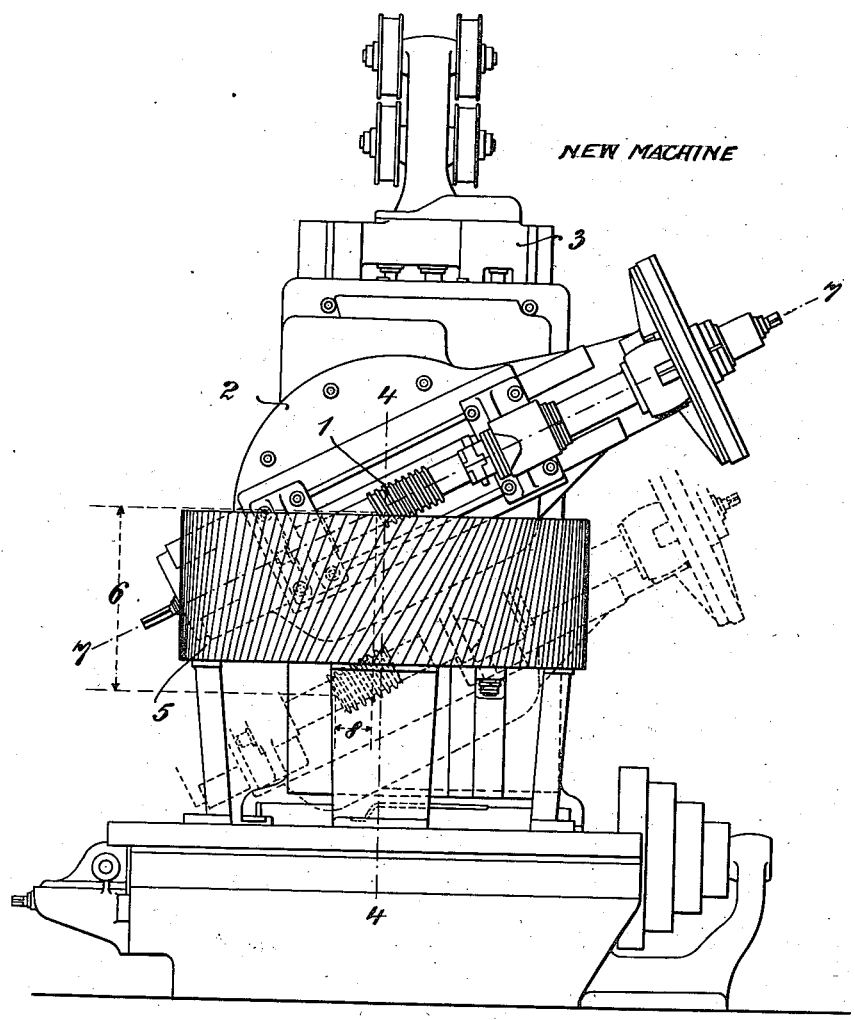

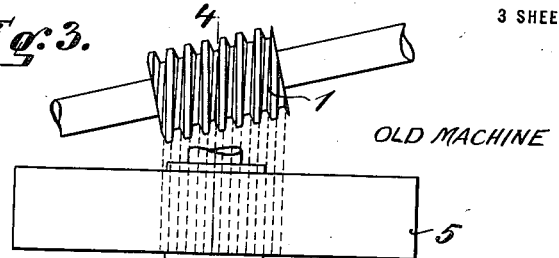
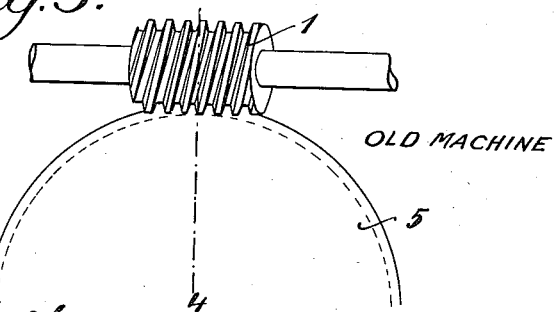
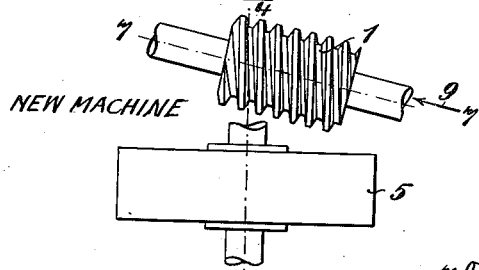
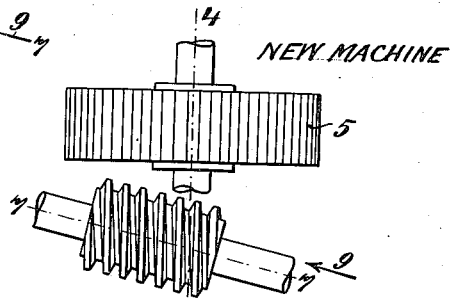
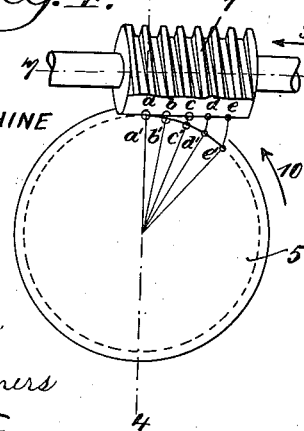
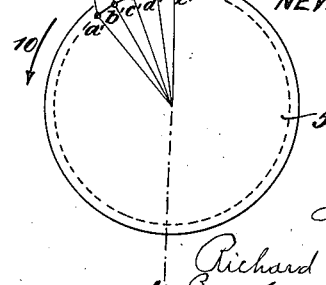

UNITED STATES PATENT OFFICE.

RICHARD REINECKER, OF CHEMNITZ, GERMANY.

METHOD OF AND APPARATUS FOR CUTTING THE TEETH OF GEAR-WHEELS.

1,140,610.  Specification of Letters Patent.  Patented May 25, 1915.

Application filed September 22, 1914. Serial No. 862,980.

*To all whom it may concern:*

Be it known that I, RICHARD REINECKER, a citizen of the German Empire, residing at Chemnitz, in the Kingdom of Saxony, Germany, have invented certain new and useful Improvements in the Method of and Apparatus for Cutting the Teeth of Gear-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in the method of and apparatus for cutting the teeth of gear wheels such as spur gears and screw gears, and more particularly in the method in which the teeth are cut by means of milling tool in the form of worms according to the involute principle.

In this method the milling tool is automatically shifted over the blank in the direction of the axis of the blank, and the milling tool is inclined relatively to the blank in such a way that the direction of its threads coincides with that of the teeth being cut on the blank. The blank must be rotated during the cutting operation, and this rotation is at a certain ratio relatively to the rotation of the blank, which ratio depends on the number of the threads of the milling tool and the desired number of the teeth of the blank. The tool and the blank are operatively connected with each other. If the rotation imparted to the blank corresponds to the number of the teeth being cut and the number of the threads of the tool, a spur gear is produced, and if the blank is rotated at a higher or lower speed, a gear wheel provided with curved teeth, and more particularly a helical gear wheel is produced. In this operation only a part of the teeth of the milling tool is made use of for cutting the teeth of the blank, and from the beginning to the end of the operation the same teeth of the milling tool are operative, while the remaining teeth are not used. Therefore the teeth of the milling tool are worn out before all the teeth of the blank have been cut, and this is particularly the case where the blank has a large diameter. For this reason the tool must be removed from the machine, ground, and again mounted on the machine. Thereby inaccuracies in the adjustment of the teeth are caused, so that the pitch of the teeth cut on the blank is not uniform, and the operation of the gear wheel is inaccurate. This is particularly the case if the tool must be exchanged several times while cutting a single wheel.

The object of the present improvements is to provide a method and an apparatus in which this objection is removed.

With this object in view my invention consists in so operating the tool and blank relatively to each other that not always the same teeth of the milling tool are used for cutting the teeth of the blank, but that during the cutting operation other parts of the milling tool come into cutting position, so that the work is distributed over a large number of the teeth of the milling tool, and the whole blank can be cut in one operation without exchanging the tool. Thereby the cutting power and the life of the tool are materially increased.

In carrying out the invention I construct the machine in such a way that an additional relative movement is imparted to the tool and the blank in the direction of the axis of the tool apart from the movement of the tool in the direction of the teeth being cut. Preferably this additional movement is imparted to the tool, and its effect is that in the course of the cutting operation always other parts of the teeth of the tool come into cutting position. According to this axial displacement a corresponding additional rotary movement must be imparted to the blank, which additional rotary movement is entirely independent of the number of the threads of the tool and the number of the teeth of the blank being cut. Therefore the axial displacement of the tool and the corresponding additional rotation of the blank can be used in the manufacture of spur gears as well as in the manufacture of screw gears made according to the well known involute method.

For the purpose of explaining the invention an example embodying the same has been shown in the accompanying drawings, in which the same letters of reference have been used in all the views to indicate corresponding parts.

In said drawings Figure 1, is a front view of an old machine of the class to which my invention relates, the tool being shown in two different positions, and the blank being shown in broken lines and in front of the tool, Fig. 2, is a similar view showing my improved machine, Figs. 3, and 3ª, are respectively a side view and a plan view of the tool acting on the blank for cutting the teeth of a spur gear, the figures illustrating the old method, Figs. 4 and 4ª, are similar views illustrating my improved method with reference to cutting the teeth of a spur gear, the parts being shown in initial positions, and Figs. 5 and 5ª, are similar views showing the parts in the final positions.

Referring at first to Fig. 1 of the drawings, the milling tool 1 is mounted on a slide 2 which is vertically shiftable on a frame 3. The milling tool 1 is movable in the direction 4—4 of the axis of the blank 5 along the path 6. The mechanism for imparting to the tool the said movements is known in the art, so that a description thereof is not necessary.

In Fig. 2 I have shown my improved machine the construction of which is substantially the same as that illustrated in Fig. 1, and corresponding parts have been indicated by the same letters of reference. In addition to the movements of the parts described with reference to Fig. 1 the tool 1 is shiftable in the direction of its axis 7—7, so that the tool is moved not only through the path 6 but is simultaneously shifted to the left a distance indicated in Fig. 2 by the numeral 8. A corresponding rotary movement is imparted to the blank 5.

In Figs. 3 and 3ª I have shown the old method in a diagrammatical way, the tool being in initial position.

In Figs. 4 and 4ª and 5 and 5ª I have shown the improved method, Figs. 4 and 4ª showing the parts in the initial positions and Figs. 5 and 5ª showing the same in the final positions after cutting the blank.

As shown the milling tool 1 is shifted in the direction of its axis, as is indicated in the figures by the arrow 9. According to this axial displacement of the tool the blank 5 is rotated in the direction of the arrow 10. Corresponding parts of the blank and tool have been indicated by the letters $a'$, $b'$, $c'$, $d'$, $e'$ and $a$, $b$, $c$, $d$, $e$.

I claim herein as my invention:

1. The herein described method of cutting the teeth of spur gears or screw gears, which consists in moving a helical cutting tool with its threads in the direction of the teeth being cut over the rim of the blank in a direction parallel to the axis of the latter while rotating the tool and the blank, and imparting axial displacement to the tool and corresponding additional rotary movement to the blank.

2. In an apparatus of the class described, the combination with a helical cutting tool, and a support for the blank, of means to impart rotary or cutting movement to the tool, means to impart relative shifting movement to the tool and blank support in the direction of the axis of the blank placed on the support, means to rotate the blank support relatively to the tool, means to axially displace the tool in the direction of its axis, and means to impart additional rotary movement to the blank support corresponding to the axial displacement of the tool.

In testimony that I claim the foregoing as my invention, I have signed my name in presence of two subscribing witnesses.

RICHARD REINECKER.

Witnesses:
F. E. STEGER,
M. ROTHE.